United States Patent
Westfield et al.

(10) Patent No.: US 12,425,062 B2
(45) Date of Patent: Sep. 23, 2025

(54) LOAD ADAPTER MODULE FOR WIRELESS DISCRETE INPUT/OUTPUT FIELD DEVICE

(71) Applicant: Rosemount Inc., Shakopee, MN (US)

(72) Inventors: Brian Lee Westfield, Victoria, MN (US); Robert Michael Weinberger, Prior Lake, MN (US); James Alan Johnson, Savage, MN (US); Greg Edward Gindele, Maple Lake, MN (US); Ryan Thomas Lindsey, Eden Prairie, MN (US)

(73) Assignee: ROSEMOUNT INC., Shakopee, MN (US)

( * ) Notice: Subject to any disclaimer, the term of this patent is extended or adjusted under 35 U.S.C. 154(b) by 396 days.

(21) Appl. No.: 18/178,982

(22) Filed: Mar. 6, 2023

(65) Prior Publication Data

US 2024/0305328 A1 Sep. 12, 2024

(51) Int. Cl.
*H04B 1/3827* (2015.01)

(52) U.S. Cl.
CPC ................ *H04B 1/3827* (2013.01)

(58) Field of Classification Search
CPC ...... A01K 2227/108; A01K 2267/0337; C07K 14/705; C12N 15/907; C12N 2310/20;
(Continued)

(56) References Cited

U.S. PATENT DOCUMENTS

| | | |
|---|---|---|
| 2,951,980 A | 9/1960 | Jones et al. |
| 4,088,974 A | 5/1978 | Zhitesky et al. |

(Continued)

FOREIGN PATENT DOCUMENTS

| | | |
|---|---|---|
| CN | 1442822 A | 9/2003 |
| CN | 101576059 A | 11/2009 |

(Continued)

OTHER PUBLICATIONS

Communication Pursuant to Article 94(3) EPC for European Application No. 22 735 736.5-1201, dated Dec. 4, 2024, 7 pages.
(Continued)

*Primary Examiner* — Nguyen T Vo
(74) *Attorney, Agent, or Firm* — Westman, Champlin & Koehler, P.A.

(57) ABSTRACT

A wireless field device for use in an industrial process includes input/output terminals configured to couple to a process interface element. A discrete input/output channel is configured to receive a discrete input signal from the process interface element through the input/output terminals when configured as a discrete input channel. The discrete input/output channel is further configured to provide a discrete output to the process interface element through the input/output terminals when configured as discrete output channel. Wireless communication circuitry transmits and receives information. A controller is configured to provide a discrete output signal to the process interface element in response to information received by the wireless communication circuitry when the discrete input/output channel is configured as a discrete output channel, and further configure to receive a discrete input signal from a process variable sensor and responsively provide an output using the wireless communication circuitry when the discrete input/output channel is configured as a discrete input channel. An external power supply input couples to an external power supply. A load adapter module couples to the discrete output signal and the external power supply input and includes a switch configured to connect the process interface element to the external power supply in response to the discrete output signal.

20 Claims, 7 Drawing Sheets

(58) Field of Classification Search
CPC .......... C12N 2503/02; G01N 2333/02; G01N 33/5067; G05B 19/0423; G05B 2219/25428; G05B 2219/33192; H04B 1/3827

See application file for complete search history.

(56) References Cited

U.S. PATENT DOCUMENTS

| | | |
|---|---|---|
| 4,183,241 A | 1/1980 | Fainzilberg et al. |
| 4,198,679 A | 4/1980 | Fainzilberg |
| 4,677,308 A | 6/1987 | Wroblewski et al. |
| 4,691,235 A | 9/1987 | Okui et al. |
| 4,764,868 A | 8/1988 | Ketelhut et al. |
| 4,897,662 A | 1/1990 | Lee et al. |
| 5,731,595 A | 3/1998 | Clark |
| 6,795,767 B2 | 9/2004 | Nakamoto et al. |
| 6,904,476 B2 | 6/2005 | Hedtke |
| 6,961,624 B2 | 11/2005 | Kirkpatrick et al. |
| 7,023,352 B2 | 4/2006 | Tseng et al. |
| 7,035,773 B2 | 4/2006 | Keyes, IV et al. |
| 7,039,744 B2 | 5/2006 | Mathiowetz et al. |
| 7,154,723 B1 | 12/2006 | Warnakulasooriya et al. |
| 7,336,068 B2 | 2/2008 | Mueller |
| 7,447,612 B2 | 11/2008 | Keyes, IV et al. |
| 7,636,615 B2 | 12/2009 | Pfingsten et al. |
| 7,848,906 B2 | 12/2010 | Keyes, IV et al. |
| 8,085,143 B2 | 12/2011 | Hollander et al. |
| 8,149,102 B1 | 4/2012 | Miller et al. |
| 8,344,880 B2 | 1/2013 | Seiler et al. |
| 8,441,266 B1 | 5/2013 | Xiao et al. |
| 8,538,732 B2 | 9/2013 | Keyes, IV et al. |
| 8,686,596 B2 | 4/2014 | Huss et al. |
| 8,892,034 B2 | 11/2014 | McGuire et al. |
| 9,200,932 B2 | 12/2015 | Sittler |
| 9,483,039 B2 | 11/2016 | Johnson et al. |
| 2002/0169524 A1 | 11/2002 | Nakamoto et al. |
| 2003/0171827 A1 | 9/2003 | Keyes, IV et al. |
| 2004/0199681 A1 | 10/2004 | Hedtke |
| 2006/0050464 A1 | 3/2006 | Von Arx et al. |
| 2006/0052905 A1 | 3/2006 | Pfingsten et al. |
| 2006/0142875 A1 | 6/2006 | Keyes, IV et al. |
| 2006/0163660 A1 | 7/2006 | Jin |
| 2006/0167644 A1 | 7/2006 | Muller |
| 2007/0142934 A1 | 6/2007 | Boeresoek et al. |
| 2007/0184684 A1 | 8/2007 | Bormann et al. |
| 2007/0290788 A1 | 12/2007 | Erkens |
| 2009/0062931 A1 | 3/2009 | Keyes, IV et al. |
| 2009/0212975 A1 | 8/2009 | Ausman et al. |
| 2009/0315725 A1 | 12/2009 | Hollander et al. |
| 2010/0318229 A1 | 12/2010 | Kaszkin et al. |
| 2011/0134973 A1 | 6/2011 | Keyes, IV et al. |
| 2011/0140902 A1 | 6/2011 | Huss et al. |
| 2013/0009472 A1 | 1/2013 | Orth |
| 2013/0278395 A1* | 10/2013 | Johnson .............. G05B 19/0423 340/12.5 |
| 2013/0319074 A1 | 12/2013 | Sittler |
| 2013/0344818 A1 | 12/2013 | McGuire et al. |
| 2015/0002185 A1 | 1/2015 | McGuire et al. |
| 2015/0231974 A1 | 8/2015 | Yunoue et al. |
| 2022/0399912 A1* | 12/2022 | Westfield .............. G05B 19/042 |

FOREIGN PATENT DOCUMENTS

| | | | |
|---|---|---|---|
| CN | 101995336 A | | 3/2011 |
| CN | 202794900 U | | 3/2013 |
| JP | S62-107301 A | | 5/1987 |
| JP | S62173580 A | | 7/1987 |
| JP | H05-204417 A | | 8/1993 |
| JP | H05-346809 A | | 12/1993 |
| JP | H8148202 | | 6/1996 |
| JP | 2002-333901 A | | 11/2002 |
| JP | 200464127 | | 2/2004 |
| JP | 2006522412 A | | 9/2006 |
| JP | 200712594 | | 1/2007 |
| JP | 2009043505 A | | 2/2009 |
| JP | 2009-080741 A | | 4/2009 |
| JP | 2011160502 A | | 8/2011 |
| JP | 2015109207 A | | 6/2015 |
| JP | 2015521290 A | | 7/2015 |
| JP | 2015527645 A | | 9/2015 |
| RU | 2278357 C2 | | 6/2006 |
| WO | 2015034559 A1 | | 3/2015 |
| WO | 2018182688 A1 | | 10/2018 |

OTHER PUBLICATIONS

Communication pursuant to Rules 161(1) and 162 EPC dated Jan. 17, 2024, for corresponding European Application No. 22735736.5, 3 pages.

Rosemount, Rosemount 702 Wireless Discrete Transmitter, Dec. 13, 2012, http://www2.emersonprocess.com/siteadmincenter/PM Rosemount Documents/00813-0100-4702.pdf.

Invitation to Pay Additional Fees, and Where Applicable, Protest Fee dated Jul. 16, 2013 for International Appln. No. PCT/US2013/029491, filed Mar. 7, 2013.

Transmittal of the International Search Report and the Written Opinion of the International Searching Authority, or the Declaration dated Sep. 13, 2013 for International Appln. No. PCT/US2013/029491, filed Mar. 7, 2013. 16 pgs.

Communication pursuant to Rules 161(1) and 162 EPC for European Patent Application No. 13713268.4-1802, dated Dec. 5, 2014, 2 pages.

Office Action from Chinese Patent Application Serial No. 201210282403.0, dated Jan. 29, 2015.

Office Action from Australian Patent Application Serial No. 2013249848, dated Mar. 17, 2015.

Office Action from Chinese Patent Application Serial No. 201210282403.0, dated Jul. 6, 2015.

Office Action from Australian Patent Application Serial No. 2013249848, dated Oct. 8, 2015.

Communication Under Rule 164(2)(a) EPC from European Patent Application Serial No. 13713268.4, dated Aug. 3, 2015.

Communication Pursuant to Rule 164(2)(b) and Article 94(3) from European Patent Application Serial No. 13713268.4, dated Sep. 22, 2015.

Examiner's Report from Canadian Patent Application No. 2866157, dated Nov. 30, 2015.

Office Action from Japanese Patent Application No. 2015-506989, dated Nov. 24, 2015.

Office Action from Russian Patent Application No. 2014146298, dated Jan. 13, 2016.

Examination Report from Indian Patent Application No. 1841/MUMNP/2014, dated Feb. 7, 2019.

Transmittal of the International Search Report and the Written Opinion of the International Searching Authority, or the Declaration dated Oct. 12, 2022 for International Appln. No. PCT/US2022/032776, filed Jun. 9, 2022, 11 pages.

Office Action from U.S. Appl. No. 17/835,514, dated Dec. 12, 2024.

First Canadian Office Action for corresponding Canadian Application No. 3,220,876, dated Oct. 8, 2024, filed Nov. 29, 2023.

Translation of Japanese Office Action for Japanese Application No. 2023-576168, dated Dec. 17, 2024, 13 pages.

* cited by examiner

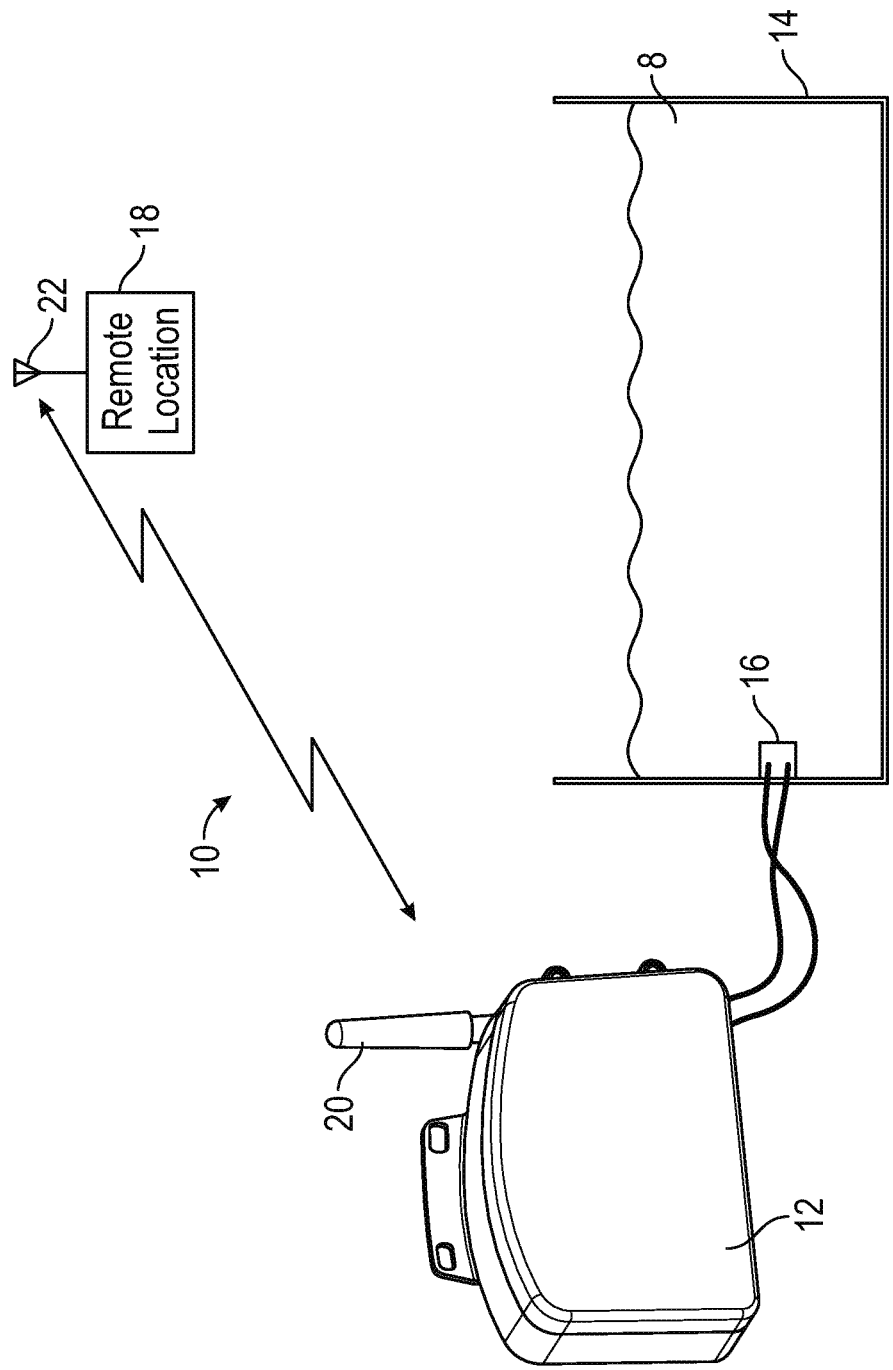

LOAD ADAPTER MODULE FOR WIRELESS DISCRETE INPUT/OUTPUT FIELD DEVICE

BACKGROUND

The present invention relates to field devices of the type used to control or monitor industrial processes. More specifically, the present invention relates to wireless industrial process field device having a discrete input and a discrete output (DIO) channel.

Industrial processes are employed in the monitoring and manufacturing of process materials and fluids such as oil, paper pulp, etc. In order to monitor operation of an industrial process, process variable transmitters are employed. The process variable transmitters measure process variables and transmit the process variable information to a centralized location. Example process variables include flow rate, temperature, pressure, fluid level, etc. The process variable transmitter is one example of a field device. Another example field device is a process control device. The process control device is used to control operation of the process by actuating a control element. For example, the process control device can actuate a motor to adjust the position of a valve, control operation of a pump, activate a heating element, etc. The process control device may receive its instructions from a centralized location.

One type of field device is a discrete Input/Output (I/O) device. A discrete I/O, or DIO, device typically includes multiple input and/or output channels and can be configured to operate as a process variable transmitter and as a process control device. The input channels can be used, for example, to detect the closure of a switch such as a liquid level switch. The output channels can be used, for example, to control an external load. However, the output channels typically can only connect the load to the low side of the power supply.

SUMMARY

A wireless field device for use in an industrial process includes input/output terminals configured to couple to a process interface element. A discrete input/output channel is configured to receive a discrete input signal from the process interface element through the input/output terminals when configured as a discrete input channel. The discrete input/output channel is further configured to provide a discrete output to the process interface element through the input/output terminals when configured as discrete output channel. Wireless communication circuitry transmits and receives information. A controller is configured to provide a discrete output signal to the process interface element in response to information received by the wireless communication circuitry when the discrete input/output channel is configured as a discrete output channel, and further configure to receive a discrete input signal from a process variable sensor and responsively provide an output using the wireless communication circuitry when the discrete input/output channel is configured as a discrete input channel. An external power supply input couples to an external power supply. A load adapter module couples to the discrete output signal and the external power supply input and includes a switch configured to connect the process interface element to the external power supply in response to the discrete output signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 1 is a simplified diagram of an industrial process control system including a discrete input/output (DIO) field device.

DETAILED DESCRIPTION OF ILLUSTRATIVE EMBODIMENTS

Figure 2A:
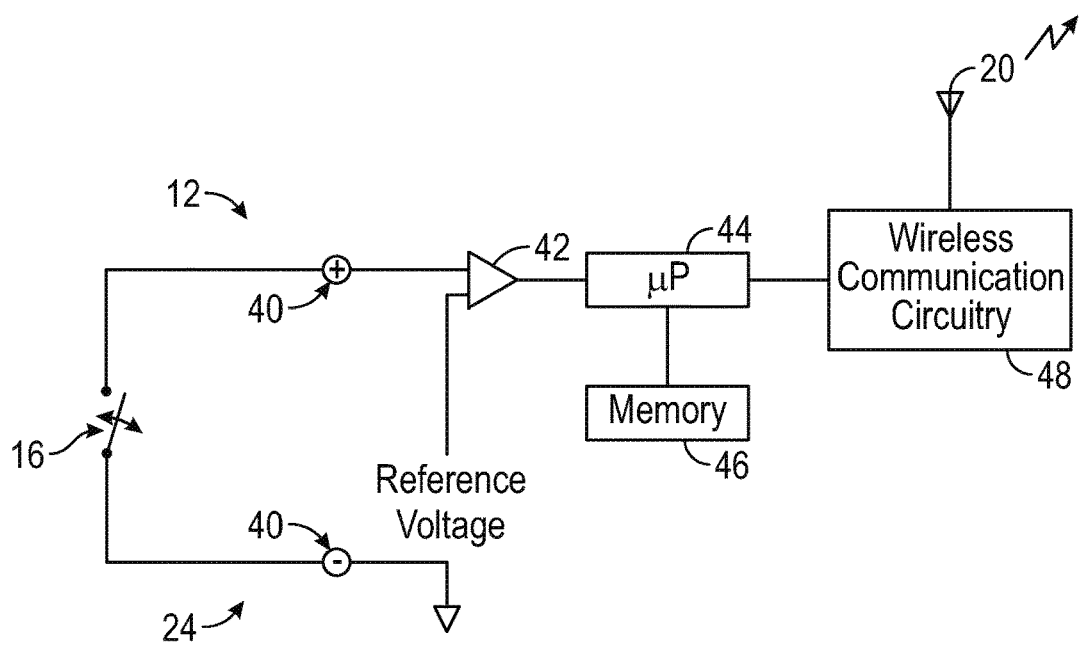
FIG. 2A illustrates a discrete input/output channel of the field device of FIG. 1 configured as an input channel.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

The field device set forth herein is capable of receiving a discrete input from a sensor in an industrial process related to a process variable. The sensor is coupled to terminals of the field device. Further, the terminals of the field device can be configured to provide a discrete output to a control element in the process. This allows the same two terminals to be configured for use in sensing a process variable as well as for controlling a process variable, as desired. As discussed herein, a load adapter module couples to the discrete output and can be used to direct power to a process control element. The field device is configured for wireless communication to a remote location. The wireless communication can be in accordance with any appropriate technique such as, for example, the WirelessHART® communication protocol in accordance with the IEC 62591 Standard.

There are many devices in the process control industry that require the load switch to be present on the positive terminal (high side) of the power supply in order to actuate. These devices typically have multiple taps that are already referenced to the negative side of the power supply. This can be problematic for wireless DIO controllers since they are only capable of having the switch located on the negative terminal of the power supply. The use of an interposing relay is required to switch the load on the positive side of the power supply. In these instances, the customer is required to mount a secondary enclosure near the field device and use an interposing relay to control the device. This creates additional cost, complexity and a potential secondary point of failure for the customer.

In one aspect, the present invention addresses this problem by providing a load adapter module which is configured to couple to terminals of a wireless DIO device. The load adapter module is further configured to couple to an external power supply and a process control device. In response to a control signal on the terminals of the DIO device, the load adapter module connects the positive terminal of the external power supply to the process control device. This allows the DIO device to be directly wired to the process control device and eliminates the need for a secondary housing, interface cable, interposing relay or other additional circuitry that an operator would need to implement. The load adapter module is transparent to the wireless DIO field device and requires no additional hardware or software to provide functionality. The load adapter module supports the same power supply range, load requirements and read back functionality as the wireless DIO device. As discussed below, the load adapter module is configured to function with both a conventional two terminal DIO channel as well as three terminal DIO channels with an internal power option. The load adapter module can include any number of channels. Preferably, the adapter module is designed to maintain hazardous and non-hazardous approval ratings. The load adapter module is preferably configured to fit within a housing of an existing DIO field device.

FIG. 1 is a simplified block diagram of an industrial process 10 including a wireless DIO process field device 12 coupled to a process vessel or tank 14. The process vessel can contain a process fluid 8. The wireless DIO field device 12 includes a discrete process interface element 16 which may comprise a control element if the device is configured to provide a discrete control output signal, or can comprise a process variable sensor if the field device 12 is configured to sense a process variable from a discrete process variable sensor. If configured to sense a process variable, the field device 12 can wirelessly communicate information related to the sensed process variable to a remote location 18 through antennas 20 and 22. The remote location 18 can comprise, for example, a central location such as a control room. Examples of a discrete process variable sensor include a switch which changes state when a particular event happens, such as a temperature threshold is exceeded or a level threshold is exceeded. Another type of discrete process variable sensor provides a series of pulses which are related to a sensed process variable which can be counted. Examples of such process variable sensors include a turbine flow meter and magnetic flow meter with pulse outputs. The field device 12 can also be configured to provide a control output. In one example of such a configuration, information is received from the remote location 18 which is used to responsively provide the control output. Examples of discrete process control elements which can be controlled by device 12 include motors, actuators, solenoids, resistive elements among others. When configured to provide a control output, the load adapter module can be used to switch power to the high side of a process control element.

Figure 2B:
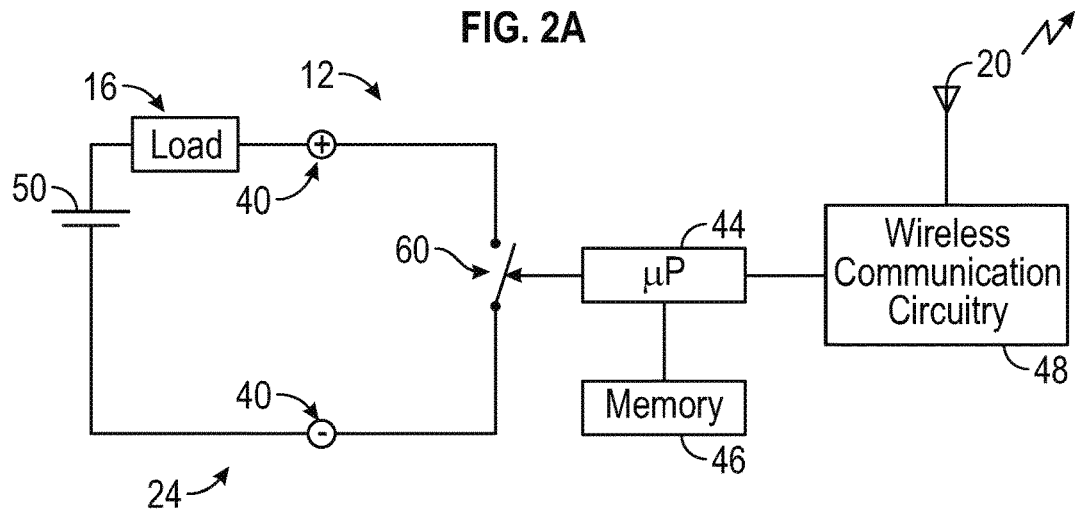
FIG. 2B illustrates a discrete input/output channel of the field device of FIG. 1 configured as an output channel.
Figure 2C:
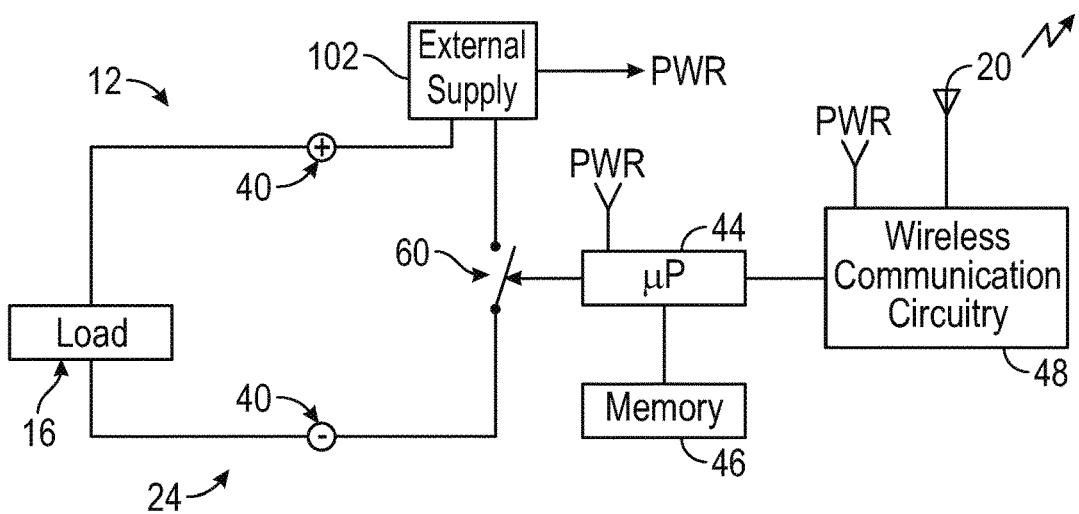
FIG. 2C illustrates a discrete input/output channel of the field device of FIG. 1 configured as an output channel and utilizing an external power supply.

FIGS. 2A-2C show example input and output configurations for a DIG field device. FIG. 2A is a simplified block diagram of field device 12 having a channel 24 configured to receive an input from a discrete process variable sensor. In FIG. 2A, the process interface element 16 is illustrated as a two-position (opened and closed) switch. For example, the interface element 16 can comprise a level switch responsive to the level of process fluid 8 carried in tank 14 illustrated in FIG. 1. The switch connects to input/output terminals 40 of the field device 12. One of the terminals 40 connects to a comparator 42 which also receive a reference voltage. For example, if the switch 16 is closed, a high output is provided to a microprocessor 44 whereas if the switch 16 is open, a low output is provided. The microprocessor 44 receives the output from the comparator 42 and operates in accordance with instructions stored in a memory 46. Based upon the received input, the microprocessor 44 can communicate wirelessly using wireless communication circuitry 48 and antenna 20.

FIG. 2B shows an alternative configuration of DIG channel 24 of field device 12. Channel 24 is coupled to a discrete control element. In FIG. 2B, the process interface element 16 is illustrated as a load which is connected to a voltage source 50. For example, the load 16 may be a relay, a valve actuator, etc. In FIG. 2B, the load 16 and voltage source 50 are coupled to the input/output terminals 40 of the field device 12. Rather than using a comparator 42, in the configuration of FIG. 2B the field device 12 couples a switch 60 to voltage source 50 through terminals 40 to connect the load to the negative side of the power supply. The switch 60 operates under the control of microprocessor 44. FIG. 2A illustrates the device 12 configured to provide an input channel, whereas FIG. 2B illustrates the device configured to provide an output channel.

FIG. 2C shows another example configuration of DIG channel 24 of field device 12. In this configuration the channel 24 couples to an external power supply 102 which is used to provide power to load 16 by connecting it to the negative side. This external power supply 102 is a common power supply and is also used to provide power to circuitry of the field device such as microprocessor 44, memory 46 and wireless communication circuitry 48.

The configuration of field device 12 which is illustrated in FIGS. 2B and 2C can be problematic in some process installations. As discussed herein, certain field devices require actuation by connecting them to the positive terminal of the power supply. Example diagrams 2B & 2C are only capable of connecting the load on the negative terminal of the power supply. This results in the need to add additional components such as an interposing relay, cabling and enclosure to control these types of field devices.

Figure 3:
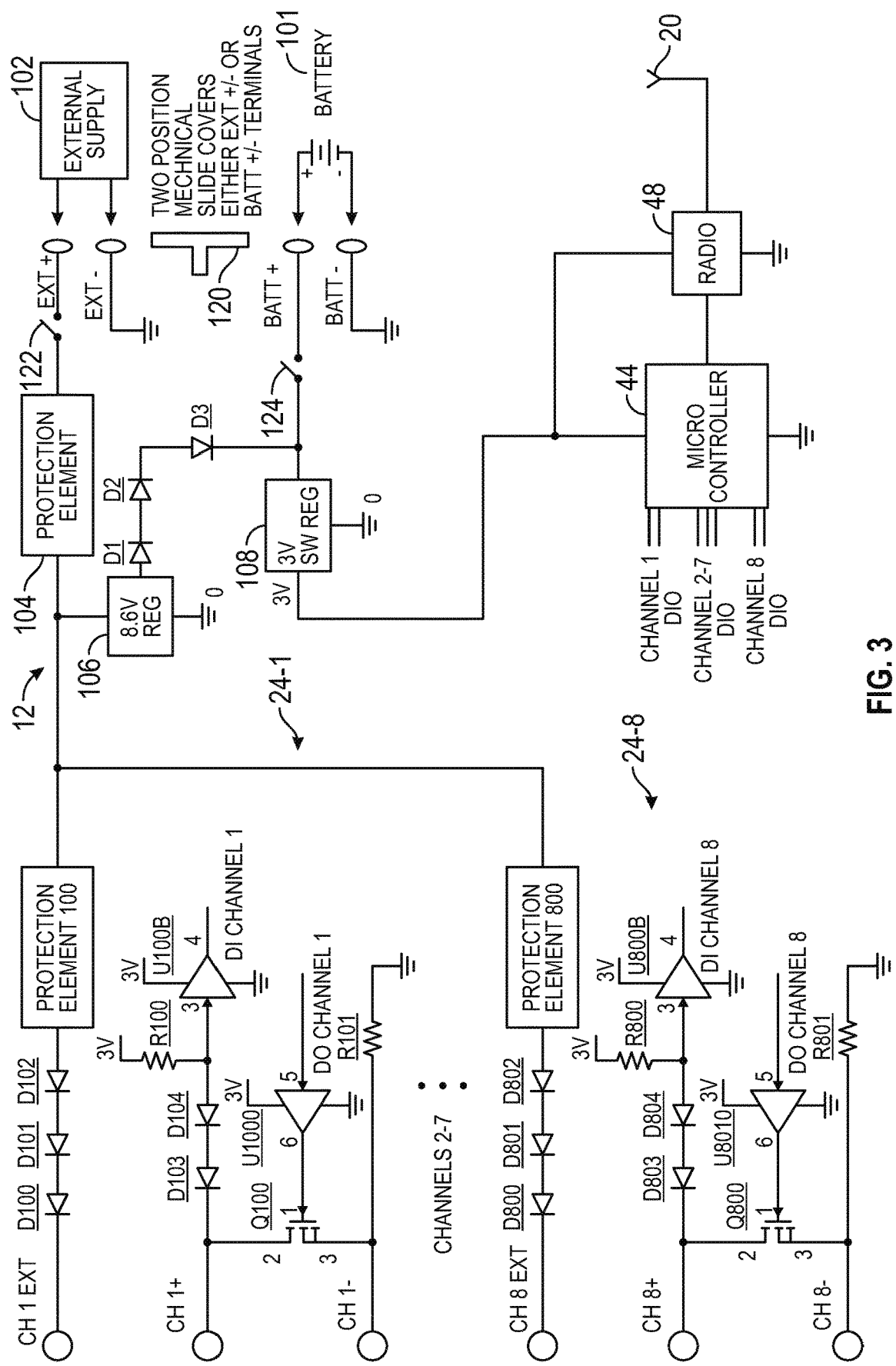
FIG. 3 is a simplified schematic diagram showing the discrete input/output field device of FIG. 1 including eight input and output channels along with an external power supply and battery connection.

FIG. 3 is a more detailed schematic diagram of the circuitry of field device 12. In FIG. 3, eight channels 24-1 to 24-8 are illustrated which operate as either input or output channels as desired. For illustrative purposes only, channel 24-1 will be discussed specifically. In channel 24-1, three input/output connections are provided: CH1 EXT, CH1+ and CH1−. Protection diodes D100, D101 and D102 are provided for intrinsic safety. In battery powered mode (discussed below in more detail) the CH1+ and CH1− connections are used for both input and output terminals. To provide a switch closure, transistor Q100 is closed using the DO CHANNEL 1 input connection through U1000. To operate as an input channel, operation amplifier U100B couples to the CH1+ input and provides an output DI CHANNEL 1 to microprocessor 44.

When connected to an external power supply, the channel 24-1 has an additional operational mode in which it can provide power to an external component such as load 16 shown in FIG. 2B. In this configuration, the external load is electrically connected between CH1EXT and CH1+. The applied voltage is adjustable by controlling the voltage of the external supply as desired.

As illustrated in FIG. 3 two optional power supplies are provided in the form of a battery 101 or an external power supply 102. External power supply 102 connects to external connections EXT+ and EXT− and similarly battery 101 connects to battery connections BATT+ and BATT−. A protection element 104 is provided to protect internal circuitry and an 8.6 voltage regulator 106 provides power through diodes D1, D2 and D3 to a switching regulator 108. Power from supply 102 is coupled to the CH1EXT channel through diodes D100-D102, protection element 100 and protection element 104. A 3V output from regulator 108 powers microcontroller 44 and wireless communication circuitry (radio 48). Microcontroller 44 receives inputs from, and provides outputs to, discrete input/output channels 24-1 . . . 24-8. An optional two position slidable cover 120 is arranged such that only one of the EXT or BATT terminals are exposed at any time.

Figure 4A:
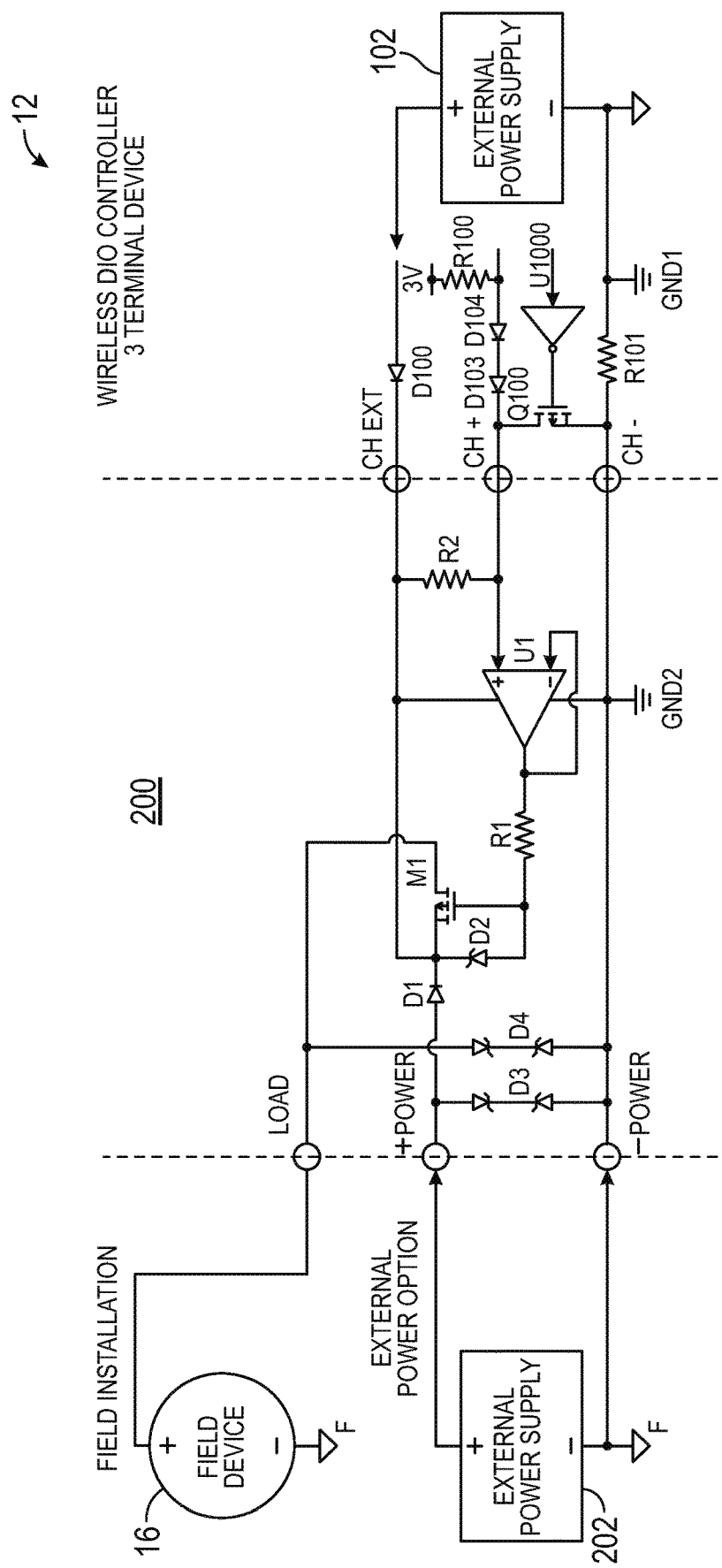
FIG. 4A is a block diagram showing a load adapter module in accordance with one example configuration coupled to a three terminal discrete input/output (DIO) field device.

FIG. 4A is a simplified electrical schematic diagram showing a load adapter module 200 in accordance with one example embodiment of the present invention. Load adapter module 200 is configured to connect to a three terminal wireless DIG device 12 as described in connection with FIG. 3. Module 200 includes a connector for connecting to the CH EXT connector which provides power, along with connections for connecting to the CH+ and CH− connectors. Module 200 also includes three output connections labeled LOAD, +POWER and −POWER for connecting to an external power supply 202 and field device 16. An operational amplifier U1 is configured to monitor the CH+ output from device 12 and is powered by a connection to the CH EXT power connection. An output from operational amplifier U1 is provided to a transistor switch M1 which is configured to switch power to LOAD connection to the field device 16 to the high side of the power supply. Module 200 can optionally be powered by external power supply 202 through steering diode D1. Clamping diodes D3 and D4 provide transient protection and resistor R1 and diode D2 protect transistor switch M1. Resistor R2 provides bias for the input of operational amplifier U1. In one configuration without the use of optional external power supply 202, when transistor switch M1 is switched on, power is supplied to the field device from the CH EXT connection and power supply 102. Diode D100 provides the power from power supply 102 to the field device 16 through transistor switch M1. If an optional external power supply 202 is employed, power is supplied to the field device 16 through steering diode D1 and transistor switch M1.

Figure 4B:
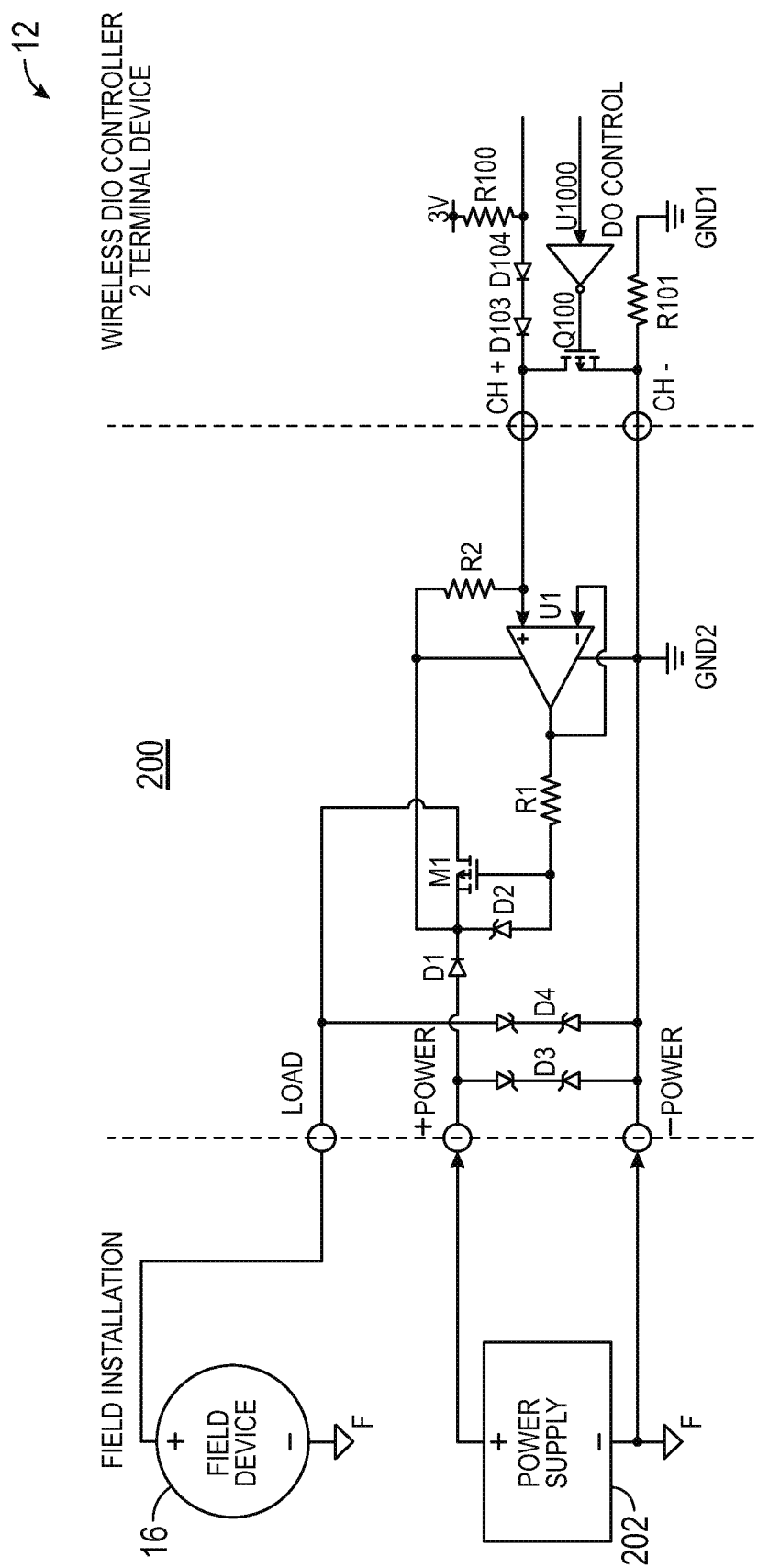
FIG. 4B is a block diagram showing a load adapter module in accordance with one example configuration coupled to a two terminal discrete input/output (DIO) field device

In FIG. 4B a configuration is illustrated in which load adapter module 200 is powered by external power supply 202 and module 200 couples to a two terminal wireless DIO field device 12. In this configuration, field device 12 only provides CH− and CH+outputs. Power is supplied to both the module 200 and the field device 16 through steering diode D1.

Figure 5:
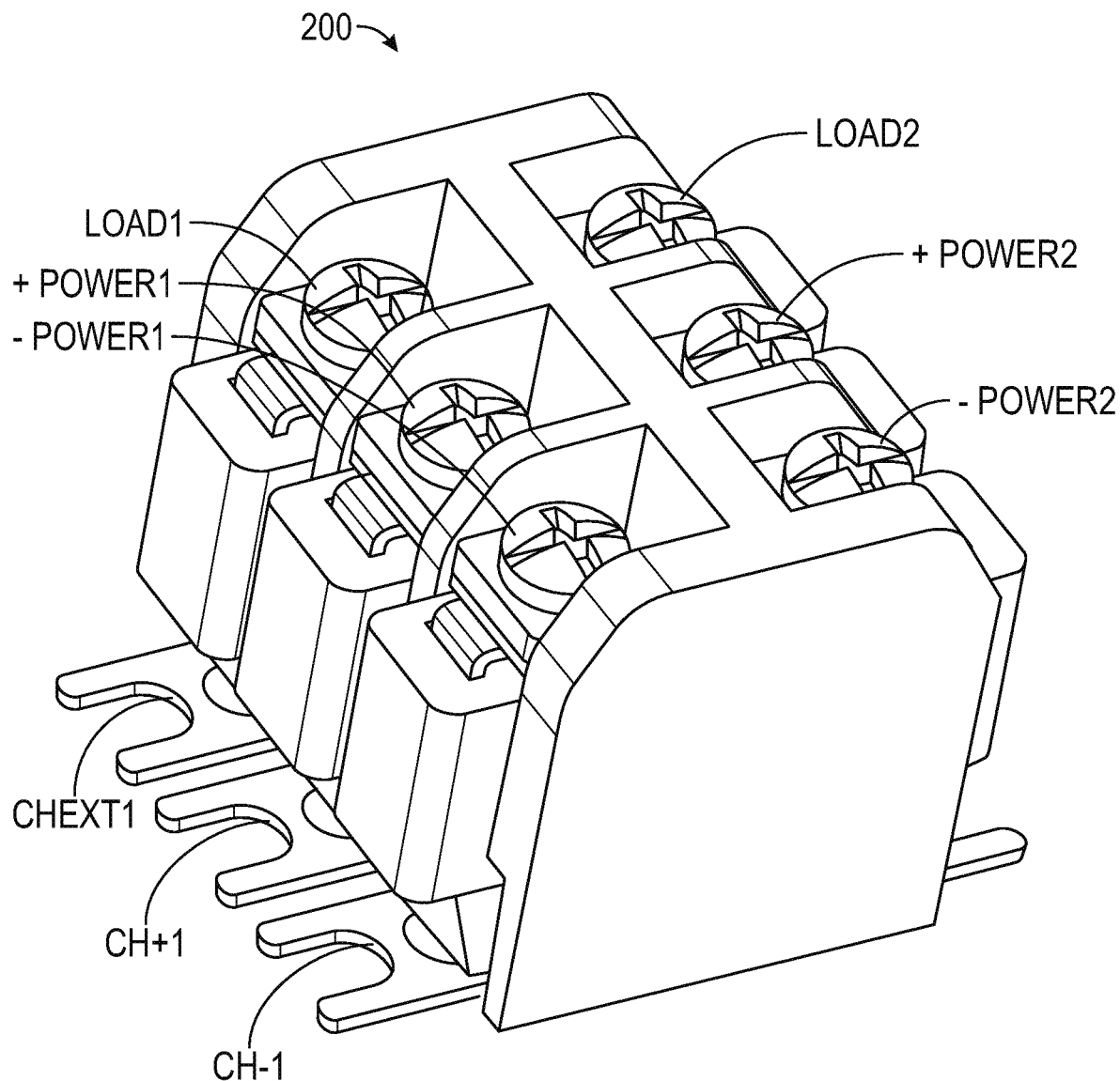
FIG. 5 is a perspective view of a load adapter module in accordance with one example configuration.

FIG. 5 is a perspective view of a configuration of load adapter module 200 configured having two channels. Input connectors CH EXT1, CH+1 and CH−1 are illustrated for connecting to device 12. Similar connections for a second channel are obscured in the perspective view of FIG. 5. Adapter module has two sets of outputs labeled LOAD1, +POWER1, −POWER1, LOAD2, +POWER2 and −POWER2. Any number of channels may be implemented in module 200. A two channel module 200 is useful in some configurations, such as a motor operated valve (MOV) application. In such a configuration, one channel is used to open the valve and a second channel is used to close the valve.

Figure 6:
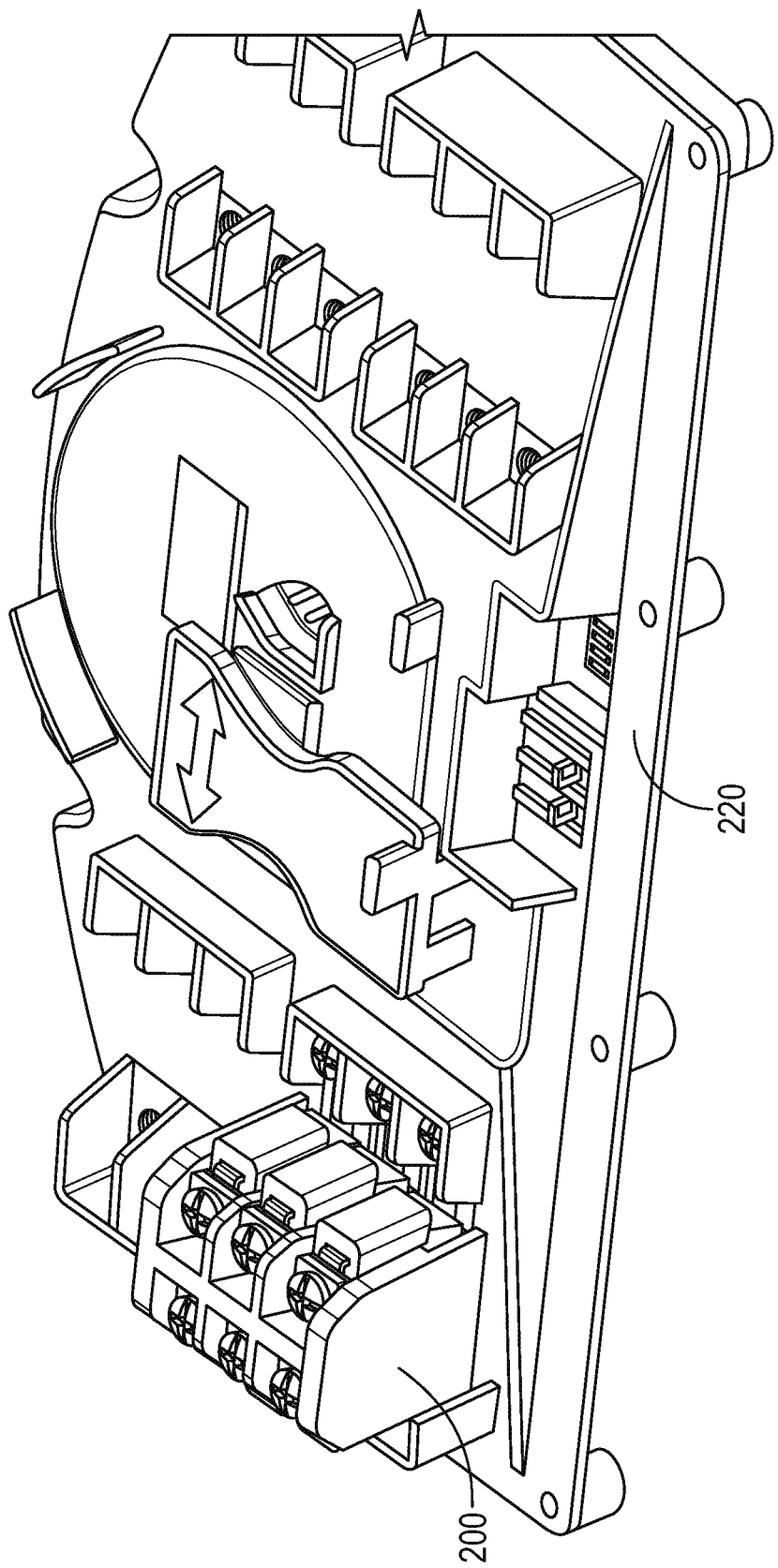
FIG. 6 is a perspective view of the load adapter module of FIG. 5 mounted to a front panel of a DIG field device.

FIG. 6 is a perspective view of a front panel 220 of DIG device 12 which includes a number of screw terminals for coupling to input and output connections to process interfaces. As illustrated in FIG. 6, adapter module 200 mounts to the front panel 220 and is screwed to terminal connections for the CH EXT, CH+ and CH− connections on the front panel 220.

The adapter module set forth herein allows for more efficient, reliable and lower cost installation of DIG field devices for use in controlling process interfaces which require a high side drive. The adapter module can be configured to be compatible with any wireless DIG device without changing hardware or firmware within the field device. The adapter module supports existing functionality of wireless DIO field devices while maintaining hazardous and non-hazardous location ratings. The adapter module operates with both two wire and three wire DIG devices. The module does not affect diagnostic functionality of the field device. Separate power supplies can be used for different channels of the adapter module thereby allowing different voltage levels to be supplied on each channel. The module is scalable and can support any number of channels housed in a field device. The power supply used to power the field device 16 can be configured to have a higher or lower voltage than the power supply 102 used to power the DIG device 12.

Although the present invention has been described with reference to preferred embodiments, workers skilled in the art will recognize that changes may be made in form and detail without departing from the spirit and scope of the invention. As set forth in the Figures, the adapter module can couple different voltage levels to the process interface element. For example, multiple external power supplies can be used. Additionally, the adapter module can be configured to operate in hazardous and/or non-hazardous environments.

What is claimed is:

1. A wireless field device for use in an industrial process, comprising:
   input/output terminals configured to couple to a process interface element;
   a discrete input/output channel configured to receive a discrete input signal from the process interface element through the input/output terminals when configured as a discrete input channel, the discrete input/output channel further configured to provide a discrete output to the process interface element through the input/output terminals when configured as discrete output channel;
   wireless communication circuitry configured to transmit and receive information;
   a controller configured to:
      provide a discrete output signal to the process interface element in response to information received by the wireless communication circuitry when the discrete input/output channel is configured as a discrete output channel;
      receive a discrete input signal from a process variable sensor and responsively provide an output using the wireless communication circuitry when the discrete input/output channel is configured as a discrete input channel;

an external power supply input configured to couple to an external power supply; and a load adapter module coupled to the discrete output signal and the external power supply input having a switch configured to connect the process interface element to the high side of an external power supply in response to the discrete output signal.

2. The wireless field device of claim 1 wherein the switch comprises a transistor.

3. The wireless field device of claim 1 including a comparator configured to couple to positive and negative channel outputs of the discrete input/output channel and responsively actuate the switch.

4. The wireless field device of claim 1 wherein the discrete input/output channel includes the external power supply input.

5. The wireless field device of claim 1 including a second internal power supply and wherein the load adapter module includes the external power supply input which is configured to couple to the second external power supply.

6. The wireless field device of claim 1 wherein the discrete input/output channel comprises three connections.

7. The wireless field device of claim 1 wherein the discrete input/output chancel comprises two connections.

8. The wireless field device of claim 1 wherein the load adapter module includes a steering diode arranged to route power from the external power supply to the switch.

9. The wireless field device of claim 1 wherein the load adapter module includes a steering diode arranged to route power from the external power supply to the circuitry of the load adapter module.

10. The wireless field device of claim 1 wherein the load adapter module is configured to be screwed to the input/output terminals of the discrete input/output channel.

11. The wireless field device of claim 1 wherein the load adapter module is configured to fit within a housing of the wireless field device.

12. The wireless field device of claim 1 wherein the load adapter module includes screw terminals configured to electrically connect to the process interface element.

13. The wireless field device of claim 1 wherein the load adapter module includes a screw terminal configured to couple to the external power supply.

14. The wireless field device of claim 1 wherein the load adapter module includes a second switch and is configured to couple to two discrete input/output channels.

15. The wireless field device of claim 1 wherein the load adapter module includes clamping diodes configured to provide transient protection.

16. The wireless field device of claim 1 including a plurality of discrete input/output channels.

17. The wireless field device of claim 16 wherein the load adapter module couples to a second discrete output signal and a second external power supply input having a second switch configured to connect a second process interface element to the second external power supply in response to the second discrete output signal.

18. The wireless field device of claim 17 wherein the second external power supply provides a voltage which is different from a voltage provided by the external power supply.

19. The wireless field device of claim 1 wherein the load adapter module is configured to operate in a hazardous environment.

20. The wireless field device of claim 1 wherein the load adapter module is configured to operate in a non-hazardous environment.

* * * * *